United States Patent [19]
Fleury

[11] 3,761,693
[45] Sept. 25, 1973

[54] AUTOMATIC MAXIMUM-TORQUE INDICATOR ASSOCIATED WITH A SHAFT AND ITS USE IN HELICOPTERS
[75] Inventor: Gerard Fleury, Marseille, France
[73] Assignee: Societe Nationale Industrielle Aerospatiale, Paris, France
[22] Filed: Mar. 30, 1972
[21] Appl. No.: 239,492

[30] Foreign Application Priority Data
Apr. 7, 1971 France .............................. 7112264

[52] U.S. Cl. .......... 235/151.3, 73/133 R, 73/136 R, 235/150.2, 244/17.13
[51] Int. Cl. ........................... G06g 7/70, G01l 3/06
[58] Field of Search .................... 235/150.2, 150.21, 235/151.3; 73/116, 133 R, 136 R, 137–138; 116/136.5; 244/17.13, 17.19; 60/39.16 R

[56] References Cited
UNITED STATES PATENTS
3,114,240  12/1963  Howard et al. .................... 73/133 X
3,287,965  11/1966  Brahm et al. ................. 235/150.2 X
3,106,062  10/1963  Rosenberg et al. ............ 60/39.16 R
3,608,368  9/1971  Cuff ............................. 116/136.5 X
3,272,004  9/1966  Haverl ........................ 235/150.2 X Primary Examiner—Charles E. Atkinson
Assistant Examiner—Jerry Smith
Attorney—Karl W. Focks

[57] ABSTRACT

A torque indicating system for the aerofoils of a helicopter comprising a pressure and temperature detector feeding, through appropriate electrical circuits, a multiplier operating a pointer.

2 Claims, 1 Drawing Figure

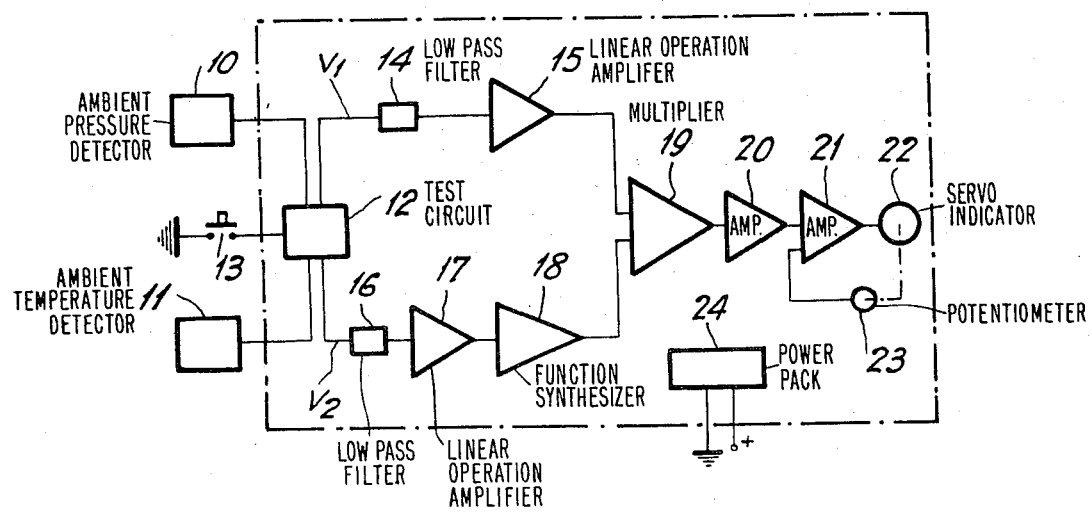

AUTOMATIC MAXIMUM-TORQUE INDICATOR ASSOCIATED WITH A SHAFT AND ITS USE IN HELICOPTERS

This invention relates to a maximum-torque indication system, of use in turbomotor-driven helicopters.

In many such helicopters, the actual power output from the or each engine is measured by a torquemeter having a detector associated with the actual engine either via the transmission shaft between the engine and the reducer or actually in the reducer, and an indicator on the instrument panel tells the pilot the actual torque output of the or each turbomotor.

The usual practice in modern helicopters having turbomotors is for the same to be used below their maximum power, particularly at low altitude, so as to have a power reserve available at higher altitudes and in hot weather. Also, the transmission elements, more particularly the main reducer, are dimensioned for a rated power less than the maximum power of the or each turbomotor at low altitude, so that the transmission elements can be of lighter weight. Most of the time, therefore, the transmission elements operate slightly below their rated power.

In addition to knowing the instantaneous torque output by the or each engine, the pilot must know what safety margin is left as regards the limitations of the or each engine and of the transmission elements, so that there is no chance of pilot action which might be dangerous due to occasional or systematic overshoot of the limitations, with the result either of permanent severe damage of the or each turbomotor due to overheating or of transmission overloads, leading to premature wear and brakage of the transmission mechanisms.

In practice, therefore, there are two limits for engine torque. One, a fixed limit, is a function of the transmission elements and is operative mainly at low altitude and in cold weather, while the other a variable limit, is a function of the turbomotor, is dependent on pressure and ambient temperature in all operating conditions of the helicopter and is normally lower than the fixed limit at high altitude or in hot weather, more particularly when there is a combination of high altitude and hot weather.

The fixed limit can readily be embodied in the form of a warning mark on the torque indicator, but the variable limits are usually to be found in charts which are contained in the flight manual and which are virtually useless to a pilot in operation.

Also known are torque indicators having provision for pressure and temperature correction by mechanical means comprising linkage and swivels. One such indicator is disclosed by French Patent Specification No. 1,559,082 in the name of Szydlowsky. A difficulty with such indicators is that they wear fairly rapidly and are affected by vibrations. Also, they are intended more particularly for supervising turbomotor operation with the aim of achieving maximum efficiency. Above all, they are of complicated construction since they make use of actual operating parameters and the limits of each such parameter.

It is also known for helicopters to have main-rotor pitch-limit indicators giving general indications of air temperature and density, the main calibration taking account of the weight of the aircraft and indirectly of the maximum torque which the transmission can deal with. Facilities of this kind give accurate and very useful indications for rotor pitch control but give no direct indications of the critical torque.

This invention relates to an automatic calculating facility from which the pilot can find out the critical torque which the turbomotor of his helicopter can provide at any particualr instant of time.

The underlying idea of the invention is that the expression for the limit torque which a turbomotor can output is given by the approximate formula:

$$C = p \cdot k \cdot f(t)$$

in which $p$ denotes the absolute ambient pressure, $k$ denotes a constant having a value of something like 1/1000 and $f(t)$ denotes a transfer function which is connected with the ambient temperature $t$ and determined by the maker experimentally.

According to the invention, the calculating facility comprises a pressure detector and an ambient-temperature detector delivering low-impedance output voltages representing the input data, the pressure-representing voltage and a voltage derived from the temperature-representing voltage by a known synthesizer of the function $f(t)$ going to the two inputs of a multiplier whose output is connected to an indicator.

Preferably, the indicator has a pointer coaxial of the pointer of the instrument indicating actual engine torque value at any time.

Preferably, the indicator incorporates a negative feedback damped galvanometer feature for improved accuracy and damping.

In a construction of this kind, the parameters embodied are merely those of an approximate theoretical formula; however, since the object is just to determine a safety limit, the construction is much simpler than it would be if the margin of possibilities of the actual parameters determining available torque were used.

The accompanying drawing, which is a block schematic view of a circuit arrangement, shows how the invention may be carried into effect.

A pressure detector 10 and a temperature detector 11 have an output each of an electrical signal proportional to ambient pressure and temperature respectively; the signals go along respective channels $V_1$, $V_2$ via a test circuit 12 controlled by a contactor 13; in normal operation circuit 12 connects the detectors 10, 11 to their respective channels $V_1$, $V_2$.

For testing, the detectors are disconnected and channels $V_1$, $V_2$ receive calibrated test signals which produce a calibrated deflection of an indicator 22 which is the final item of the various circuits; the injection of these calibrated test signals enables the general operation of the facility to be checked.

In normal operation the signals from detector 10 in channel $V_1$ are filtered by a low-pass filter 14 having a cut-off frequency of e.g. 1 Hz, to remove induced interfering signals, and are then adapted and amplified in a linear operation amplifier 15. The signals go therefrom to one of the inputs of a multiplier circuit 19 the second output of which receives the signals form channel $V_2$.

The signal from detector 11 is filtered by a low-pass filter 16 of the same kind as filter 14 and for the same purpose, then adapted and amplified in a linear operation amplifier 17 of the same kind as amplifier 15, then injected into a known function synthesizer circuit 18 comprising diodes.

This synthesizer circuit may be of the known type "FPFX-P" made by "Philbrick Nexus".

Circuit 18 outputs a signal whose voltage is of the form $k \cdot f(t)$ and which is injected into one input of multiplier circuit 19; the same, since it receives on the second input a signal, the voltage of which is proportional to $p$ performs the operation $k \cdot f(t) \cdot p = C$ and therefore outputs a signal proportional to the theoretical turbomotor torque limit. This multiplier may be of the "type 4450" made by "Philbrick Nexus". The latter signal goes through a power amplifier 20 and is applied to a servo-motor amplifier 21, the servo-motor moving the pointer of the torque indicator and a control potentiometer 23. The same outputs a signal which is injected to amplifier 21. The same delivers an error voltage which is the result of the difference between the signal from amplifier 20 and the signal from potentiometer 23. The system 21 – 23 is a known negative feed back facility for damping the indicator as is known e.g. in negative feed back damped galvanometers.

As already stated, the indicator can, with advantage, have two concentric pointers, one indicating the engine torque limit and the other the actual engine torque, the actual-engine-torque pointer being operated by a known kind of torque meter. The fixed limit which depends on the strength of the transmission is indicated by a fixed mark on the instrument dial. The instrument can be graduated in percentage of the fixed torque limit of the transmission, in which event the figure 100 represents an absolute torque limit.

The facility hereinbefore described is powered by a power pack 24 which runs off e.g. the helicopter power supply.

The invention is of use in helicopters whose rotor is driven by a turbomotor and serves to prevent pilot error. I claim:

1. A calculating device for giving an approximation of the maximum torque which can be provided by a turbomotor driving the aerofoil of a helicopter comprising:
   a pressure detector providing a D.C. low-impedance output voltage $p$ corresponding to the ambient pressure;
   a temperature detector providing a low-impedance output voltage $t$ corresponding to the ambient temperature;
   a function synthesizer receiving said voltage $t$ and providing a voltage corresponding to $k \cdot f(t)$, $k$ being a constant and $f(t)$ a transfer function experimentally determined;
   an electronic multiplier having two inputs respectively connected to the output of said pressure detector and said function synthesizer and a servomotor driven indicator connected to the output of said multiplier.

2. A calculating device according to claim 1 wherein the D.C. output voltages of said pressure and temperature detectors are respectively transmitted via a very-low-pass filter and a linear amplifier.

* * * * *